Patented July 4, 1950

2,513,550

UNITED STATES PATENT OFFICE 2,513,550

PREPARATION OF 2-SUBSTITUTED PYRIMIDINES

Joe Haller Clark, Glenbrook, Conn., assignor to American Cyanamid Company, New York, N. Y., a corporation of Maine No Drawing. Application December 23, 1946, Serial No. 718,127

5 Claims. (Cl. 260—251)

This invention relates to an improvement in the art of preparing 2-substituted pyrimidines.

Although 2-substituted pyrimidines have been prepared from unsubstituted amidines and esters of malonic acid, the processes heretofore available are subject to numerous disadvantages from a commercial point of view. One such process involved the necessity of first preparing an unsubstituted amidine by treatment of a suitable nitrile with anhydrous alcoholic hydrogen chloride followed by treatment of the product with alcoholic ammonia and subsequent isolation of the amidine as the hydrochloride salt. Upon neutralization of the hydrochloride the product was then condensed with malonic acid esters to yield 2-substituted-4,6-dihydroxypyrimidines. All of these operations had to be carried out under carefully controlled and anhydrous conditions.

I have discovered that 2-alkyl 4,6-dihydroxypyrimidines can be prepared much more simply and under less critical reaction conditions by first preparing an alkali metal salt of a desired amidine and without isolation thereof reacting the alkali metal salt with an ester of malonic acid to yield an alkali metal salt of the corresponding 2-substituted-4,6-dihydroxypyrimidine. This latter reaction may be illustrated by means of the following equation. In the equation R represents an alkyl radical

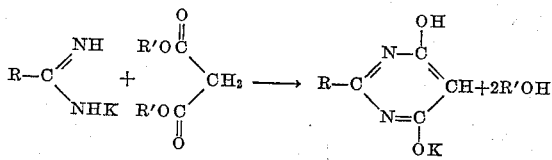

It should be understood that the process probably does not take place directly as shown. Undoubtedly, the reaction requires the formation of intermediate substances and rearrangement of the molecular structure from the keto to the enol form.

The reaction takes place in the presence of a strong alkali which acts as a catalytic agent, for example, an alkali metal alkoxide or a strong alkali such as potassium hydroxide. In such case the product formed would be the dialkali metal salt of the 2-substituted-4,6-dihydroxypyrimidine. The free 2-substituted-4,6-dihydroxypyrimidine is formed during the purification process upon neutralization of the salt with an acid.

Although my process may start with an alkali metal amidine as one of the intermediates, I prefer to prepare this material in situ from more readily available substances. To do this an alkali metal amide is formed, as by the reaction of anhydrous ammonia and potassium or sodium metal. The alkali metal amide is then mixed with a desired alkyl nitrile and the excess ammonia is removed by evaporation. As a result of this reaction an alkali metal amidine is formed.

Without isolating or otherwise purifying the alkali metal amidine, I then add to it an ester of malonic acid and a strong alkali catalyst previously dissolved in anhydrous alcohol. After the solids have been dissolved, the temperature of the mixture is raised and the alcohol which is present as solvent and which forms as a result of the reaction is distilled off. The resulting alkali metal salt of the 2-substituted-4,6-dihydroxypyrimidine is then recovered and purified if desired.

It will be apparent to those in the art that this simple method has many advantages over the more cumbersome procedures previously available. As indicated, I may use any of the alkali metal amidines including sodium, potassium, and lithium salts. Although the preparation of these alkali metal amidines has been previously described, a process preferred by me is shown in the specific examples which follow hereinafter.

Also, as indicated above, the catalyst is preferably an alkali metal ethoxide such as sodium ethoxide, potassium ethoxide and/or the alkali metal alkoxide of other simple aliphatic alcohols. The reaction solvent is also preferably one of the numerous simple alcohols such as methanol, ethanol, isopropanol or the like.

The preferred alkali metal amidines are the alkyl amidines which may be easily prepared as will be illustrated hereinafter from any suitable alkyl nitrile having up to 17 or more carbon atoms. Dinitriles may also be used with the production of interesting dipyrimidines characterized by having an alkylene linkage at the 2 position. Such nitriles include succinonitrile, sebaconitrile and the like. Still other nitriles such as nicotinonitrile may also be used in the process.

To illustrate the invention in greater particularity the following examples are given. These examples illustrate preferred processes and are not intended to limit the invention to any particular reactants or reaction conditions shown.

EXAMPLE 1

*2-n-octyl-4,6-dihydroxypyrimidine*

15.9 g. (0.4 atom) of potassium
600 cc. (approximately) of anhydrous ammonia
1 g. of iron oxide (black; ferro-ferric)
58 g. (0.41 mole) of pelargononitrile
140 g. (140 cc.; 0.88 mole) of ethyl malonate in 150 cc. of anhydrous 2B alcohol
12 g. (0.52 mole) of sodium in 300 cc. of anhydrous 2B alcohol The ammonia was drawn from a tank into a 1-liter round bottom flask immersed in an alcohol bath in a 1-gallon Dewar flask.

The iron oxide and then the potassium were added to the ammonia. The resulting solution had a deep purple color which changed to a light yellow after thirty minutes to an hour when the dissolved potassium had been converted to potassium amide. The nitrile was added at this point and the mixture was then allowed to stand until all the ammonia had evaporated, a total of about forty hours.

The mixture of alcohol and ethyl malonate was added followed by the solution of sodium ethoxide in alcohol. Practically all of the solid dissolved. The reaction mixture was then distilled at atmospheric pressure until the residue was a quite sirupy liquid.

This residue was dissolved in about 500 cc. of water and a small amount of insoluble oil removed from the solution. The solution was treated with activated charcoal, filtered and the filtrate acidified with acetic acid. The resulting precipitate was filtered and recrystallized from about 400 cc. of acetic acid, using charcoal. There was obtained in this way 37 g. of product which melted with decomposition at 277° (corr.). The filtrate was concentrated to about 100 cc. and poured into 500 cc. of water. The precipitated solid was filtered, digested with 350 cc. of alcohol, filtered hot, and washed with ether. The product weighed 9 g. and decomposed at 278° (corr.). The total yield of 2-n-octyl-4,6-dihydroxypyrimidine was 46 g. (50%).

EXAMPLE 2

*2-n-hexyl-4,6-dihydroxypyrimidine*

28.8 g. (0.735 atom) of potassium
750 cc. of ammonia
2 g. of iron oxide (black)
84 g. (0.755 mole) of enanthonitrile
250 g. (250 cc.; 1.55 moles) of ethyl malonate in 275 cc. of anhydrous 2B alcohol
23 g. (1 mole) of sodium in 350 cc. of alcohol The reaction was run as described for the n-octyl compound. There was obtained a total of 56 g. of 2-n-hexyl-4,6-dihydroxypyrimidine decomposing at 281° (corr.) and 11 g. at 279°, a total of 67 g. (45%).

EXAMPLE 3

*2-n-butyl-4,6-dihydroxypyrimidine*

36.2 g. (0.92 atom) of potassium
1 g. of black iron oxide
750 cc. of anhydrous ammonia (approximately)
83 g. (103 cc.; 1.0 mole) of n-valeronitrile (EK No. 272)
29 g. (1.25 atoms) of sodium in 250 cc. of 2B absolute alcohol
320 g. (2 moles) of ethyl malonate in 300 cc. alcohol The reaction was run as described for 2-n-octyl-4,6-dihydroxypyrimidine. One crystallization from acetic acid gave very pure 2-n-butyl-4,6-dihydroxypyrimidine; yield: 87 g. (56%). The decomposition point was 307-309° (corr.) when the temperature was raised fairly rapidly.

I claim:

1. A process of preparing 2-alkyl-4,6-dihydroxypyrimidines which comprises the steps of bringing together an alkali metal amide and an alkyl nitrile in liquid ammonia, and after reaction thereof removing the excess ammonia, adding to the product a diester of malonic acid, an alkali metal alkoxide, and a substantially anhydrous alcohol, whereupon there is formed an alkali metal salt of a 2-alkyl-4,6-dihydroxypyrimidine and thereafter recovering the said pyrimidine.

2. A process of preparing 2-alkyl-4,6-dihydroxypyrimidines which comprises the steps of bringing together a potassium amide and an alkyl nitrile in liquid ammonia, and after reaction thereof removing the excess ammonia, adding to the product a diester of malonic acid, an alkali metal alkoxide, and a substantially anhydrous alcohol, whereupon there is formed a potassium salt of a 2-alkyl-4,6-dihydroxypyrimidine and thereafter recovering the said pyrimidine.

3. A process of preparing 2-alkyl-4,6-dihydroxypyrimidines which comprises the steps of bringing together a sodium amide and an alkyl nitrile in liquid ammonia, and after reaction thereof removing the excess ammonia, adding to the product a diester of malonic acid, an alkali metal alkoxide, and a substantially anhydrous alcohol, whereupon there is formed a sodium salt of 2-alkyl-4,6-dihydroxypyrimidine and thereafter recovering the said pyrimidine.

4. A process of preparing 2-alkyl-4,6-dihydroxypyrimidines which comprises the steps of mixing together in liquid ammonia potassium amide and an alkyl nitrile and after reaction thereof removing the excess ammonia, adding to the reaction product a dialkyl malonate, an alkali metal ethoxide, and substantially anhydrous ethyl alcohol and after reaction thereof to form a potassium salt of a 2-alkyl substituted-4,6-dihydroxypyrimidine, recovering the said pyrimidine.

5. A process of preparing 2-alkyl-4,6-dihydroxypyrimidines which comprises the steps of mixing together in liquid ammonia potassium amide and an alkyl nitrile and after reaction thereof removing the excess ammonia, adding to the reaction product diethyl malonate, an alkali metal ethoxide, and substantially anhydrous ethyl alcohol and after reaction thereof to form a potassium salt of a 2-alkyl substituted-4,6-dihydroxypyrimidine, recovering the said pyrimidine.

JOE HALLER CLARK.

REFERENCES CITED

The following references are of record in the file of this patent:

Jour. Am. Chem. Soc., 44; 361-366.
Chemical Reviews, Dec. 1944, pages 359, 398, and 399.